United States Patent [19]

Greer et al.

[11] 3,971,687
[45] July 27, 1976

[54] METHOD FOR FORMING DOUBLE-WALLED UNITS

[75] Inventors: Kent Reaney Greer, Marple Bridge; William Rodney Hampson, Pirton near Hitchin; Benjamin James Smith, Welwyn Garden City, all of England

[73] Assignee: Imperial Chemical Industries Limited, London, England

[22] Filed: Aug. 28, 1974

[21] Appl. No.: 501,441

Related U.S. Application Data

[63] Continuation-in-part of Ser. No. 490,189, July 19, 1974, abandoned, which is a continuation of Ser. No. 255,637, May 22, 1972, abandoned.

[30] Foreign Application Priority Data

May 25, 1971 United Kingdom............... 16870/71
Feb. 17, 1972 United Kingdom................ 7428/72
July 5, 1974 United Kingdom............... 29895/74

[52] U.S. Cl................................ 156/221; 156/224; 156/229; 156/494; 264/88; 264/92; 264/164; 425/387 B
[51] Int. Cl.²......................................... B32B 31/00
[58] Field of Search ............ 156/99, 102, 103, 104, 156/105, 109, 156, 196, 198, 221–224, 229, 267, 285, 287, 288, 292, 320, 381, 382, 494; 264/68, 88, 89, 90, 92, 93, 94, 96, 100, 164; 425/342, 387, 388; 65/357, 361, 286; 161/36–40, 45; 428/31, 34, 46–48

[56] References Cited
UNITED STATES PATENTS

| 1,310,439 | 7/1919 | Roberts | 156/156 |
|---|---|---|---|
| 2,142,445 | 1/1939 | Helwig | 264/88 |
| 2,448,173 | 8/1948 | Cowan | 156/196 |
| 2,564,656 | 8/1951 | Chedister | 264/96 |
| 2,599,554 | 6/1952 | Howenstine | 264/93 |
| 3,140,325 | 7/1964 | Graff | 156/224 |
| 3,281,301 | 10/1966 | Bolesky | 156/221 |
| 3,390,482 | 7/1968 | Holtvoigt | 156/285 |
| 3,616,197 | 10/1971 | Amberg | 156/229 |

*Primary Examiner*—William A. Powell
*Assistant Examiner*—John E. Kittle
*Attorney, Agent, or Firm*—Darby & Cushman Cushman

[57] ABSTRACT

A method of forming a double-walled unit from thermoplastic materials, preferably polymethyl methacrylate, in which two sheets, one of which is provided with an aperture to allow the passage of air between the sheets, are stretched apart under thermoforming conditions by imposed pressure differences, the desired spatial relationship between the sheets being obtained by adjustment of the pressure differences, and in which the sheets are simultaneously bonded about their perimeters.

9 Claims, 9 Drawing Figures

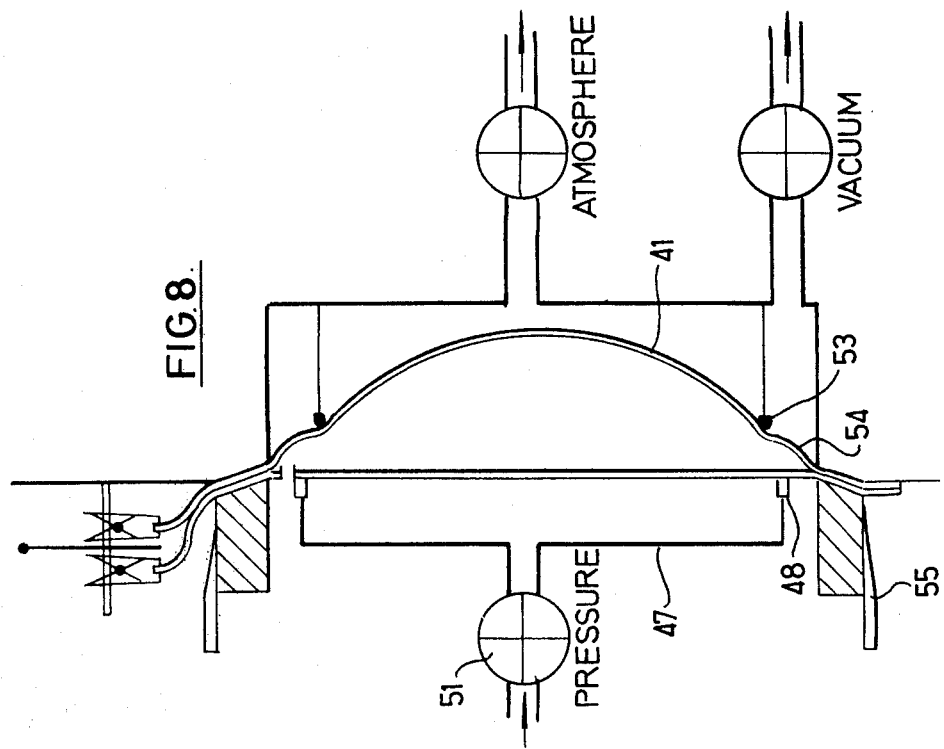
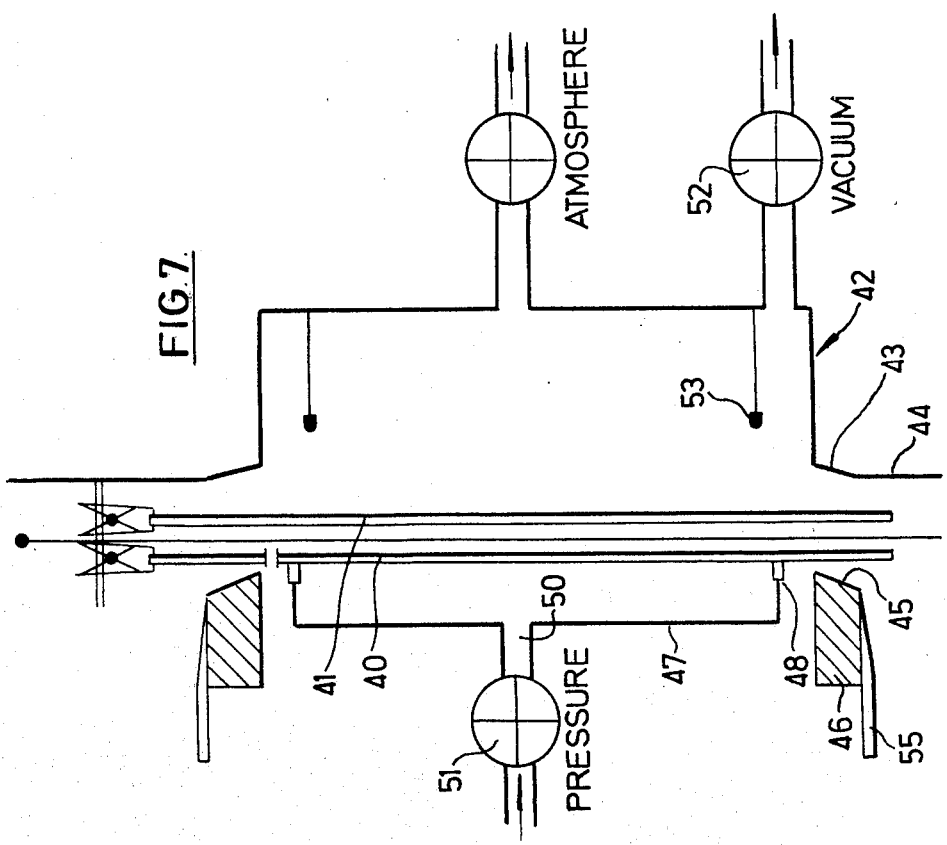

METHOD FOR FORMING DOUBLE-WALLED UNITS

This application is a continuation-in-part application of our abandoned application Ser. No. 490,189 filed July 19, 1974 as a continuation of abandoned application Ser. No. 255,637, filed May 22, 1972.

This invention relates to a process and apparatus for manufacturing a double-walled unit. It further relates to double-walled units which are suitable for glazing applications and to processes for manufacturing such units by thermoforming techniques.

The use of double-walled glazing units in buildings or vehicles such as caravans is a well-known method of improving the heat and sound insulation of such structures. An improved method of manufacturing double-walled units has now been developed.

Accordingly there is provided a method of forming a double-walled unit comprising the steps of (1) selecting two sheets, a first sheet having a perimeter fitting wholly within or matching the perimeter of the second sheet, at least one of the sheets being of an organic-thermoplastic material, (2) providing at least one aperture to allow the passage of air into the space between the sheets, (3) providing means for bonding the two sheets together about their perimeters and heating at least one thermoplastic sheet to a temperature above the softening point of the thermoplastic, (4) stretching the heated thermoplastic sheet relative to the other bonded sheet by means of different pressures acting on each of the sheets and (5) allowing the unit to cool below the softening point of the thermoplastic material.

The pressure used for stretching the sheets may be either a positive pressure above atmospheric pressure or a pressure below atmospheric pressure, that is a vacuum. In either case the pressure applied to the two sheets in the process of the invention is different. In the simplest case the aperture allowing the passage of air into the space between the sheets permits one of the sheets to be at atmospheric pressure whilst a vacuum is applied to the other sheet to stretch it. In a preferred system an aperture is provided through one sheet so that the other sheet can be stretched independently of the apertured sheet when the sheets are bonded together. The aperture may however be provided by a passage extending between the sheets rather than an aperture through one of the sheets.

The heating required to soften the sheet may be carried out before, after or simultaneously with the step of bonding the sheets together. The process may be carried out, for example, in a process in which the heated sheet is brought into contact with the other sheet which may or may not be heated and a clamping means is applied thereby bonding them together by the application of pressure over the area of the sheets contacted by the clamping means. Alternatively, the sheets may be bonded together prior to clamping the sheets in a frame and applying heat to soften at least one of the sheets to permit it to be thermoformed. In yet another method envisaged the sheets are assembled in a clamping frame and heat is applied to the clamping frame to provide a means of bonding the sheets together about their perimeters, and additionally, heat is applied to at least one thermoplastic sheet using, for example, a portable infra-red heater to soften the sheet sufficiently to enable it to be thermoformed according to the process of the invention.

In its simplest form the invention comprises a method of producing a double-walled article from two sheets of thermoplastic material by simultaneously thermoforming at least one of the sheets and bonding the sheets together over a narrow band extending inwardly from their edges. The walls of the articles formed by the process of this invention may be disposed relative to each other in any suitable configuration depending on the application envisaged for the article. Thus, one of the walls of the double-walled unit may be flat whilst the other is curved, for example, being hemispherical in shape. Alternatively, when the article is to be used for a double glazing unit for a window the spaced-apart walls may be in an essentially parallel relationship to each other. Yet again, when the double-walled unit produced by the process of the invention is required for use as a double-walled domelight, the unit may be in the form of one dome contained within a larger second dome, the basal portions of the domes being bonded together.

A process according to the invention, suitable for forming a double-walled unit having walls spaced apart in substantially parallel relationship, may comprise thermoforming one of a pair of thermoplastic sheets, which have previously been bonded together, by the application of different pressures to each of the sheets at least one of which has been heat softened, and subsequently adjusting the pressures on either side of the stretched sheet to bring it into substantially parallel alignment with the second sheet. This is accomplished by the provision of a supporting member in the form of an upstanding rim which the stretched sheet contacts in the process of thermoforming thereby providing a substantially sealing engagement of the sheet with the rim and permitting the shape of that portion of the stretched sheet contained within the rim to be further controlled by adjustment of the pressure on either side of that portion of the sheet.

Accordingly there is further provided a method of forming a double-walled unit as defined above in which an organic thermoplastic sheet is heated and stretched away from the other sheet by means of the application of different pressures to the two sheets until the stretched sheet makes contact with a supporting rim spaced-apart from the organic thermoplastic sheet, and the atmospheric pressure on either side of the stretched sheet contained within the rim is then rapidly equalised to bring the spaced-apart sheets into substantially parallel relationship while maintaining contact between the rim and the stretched sheet, before the unit is allowed to cool below the softening point of the thermoplastic material.

The means for bonding the sheets together may consist solely of applying pressure to selected areas of the contacted and softened sheets. It is preferred however that an adhesive, which is capable of forming a bond between the sheets with or without the application of heat and/or pressure, is applied to a selected area of at least one of the sheets. In one embodiment of the process a strip of material which may be activated by heat and/or pressure to form an adhesive material may be inserted between the sheets before pressure is applied to form a bond between the sheets. In another embodiment a heat-activatable adhesive in the form of a solution may be applied to the surface of a selected area of at least one of the sheets and the solution allowed to dry to give a film of adhesive which is activated to form a bond between the sheets when the heat-softened sheets are clamped prior to the thermoforming operation. For example where the sheets used in the process of the invention are of poly(methyl methacrylate) a convenient adhesive to use is 'Tensol' No. 10 (Imperial Chemical Industries Limited). 'Tensol' No. 10 is a solution of low molecular weight poly(methyl methacrylate) in methyl methacrylate and may be dried to a non-tacky film at ambient temperatures. Sheets treated with this adhesive may be stored in contact for considerable periods without deterioration in the effectiveness of subsequent bonding.

Heating of the sheet or sheets to be thermoformed may be carried out by any of the methods known in the art. Thus the sheets may be heated in an oven to a temperature above the softening point of the thermoplastic material before transferring the sheets to the thermoforming apparatus.

The scope of the invention also includes an apparatus for forming a double-walled unit from a pair of thermoplastic sheets comprising means for clamping the pair of sheets together at their peripheries, means for permitting the passage of air into the space between the sheets, means for heating at least one of the sheets to above the softening point of the thermoplastic means for applying different fluid pressures to each of the sheets to stretch a heat softened sheet relative to the other sheet to give a desired separation of the sheets.

In a preferred embodiment the apparatus is provided with an upstanding rim for receiving a stretched sheet and means for independently varying the pressures acting on the areas of the stretched sheet inside and outside the contacted rim.

Whilst the application of different pressures to the two sheets may be effected by a single source of pressure or vacuum acting on one sheet, the other sheet being subject to a different pressure by virtue of the provision for air to pass into the space between the sheets, it is also envisaged that separate sources of pressure or vacuum can be used for each of the pair of sheets. This arrangement is particularly useful for forming double-walled domelights.

Accordingly there is provided a method of forming a double-walled domelight comprising heating a pair of organic thermoplastic sheets above the softening point of the thermoplastic, clamping the pair of sheets between a pair of cooperable members with complementary sloping surfaces to bond them together and to provide a sloping flange on the bonded sheets, stretching a first sheet away from the second sheet by the application of different pressures acting on the two sheets, until the first sheet contacts a supporting rim spaced apart from the first sheet and enclosing a major proportion of the area of the stretched sheet, maintaining a pressure on the band of the first sheet lying outside the supporting rim to form a shoulder around the sheet between the rim and the clamped portion of the sheet, applying a pressure to the second sheet to stretch it towards the first sheet until the two sheets have a desired spatial relationship, before the unit is allowed to cool below the softening point of the thermoplastic sheet.

In order that the invention may be more clearly understood, and further inventive features become apparent, the invention is now described with reference to the attached drawings.

FIGS. 7, 8 and 9 illustrate an alternative method of forming a double-walled domelight.

Figure 1:
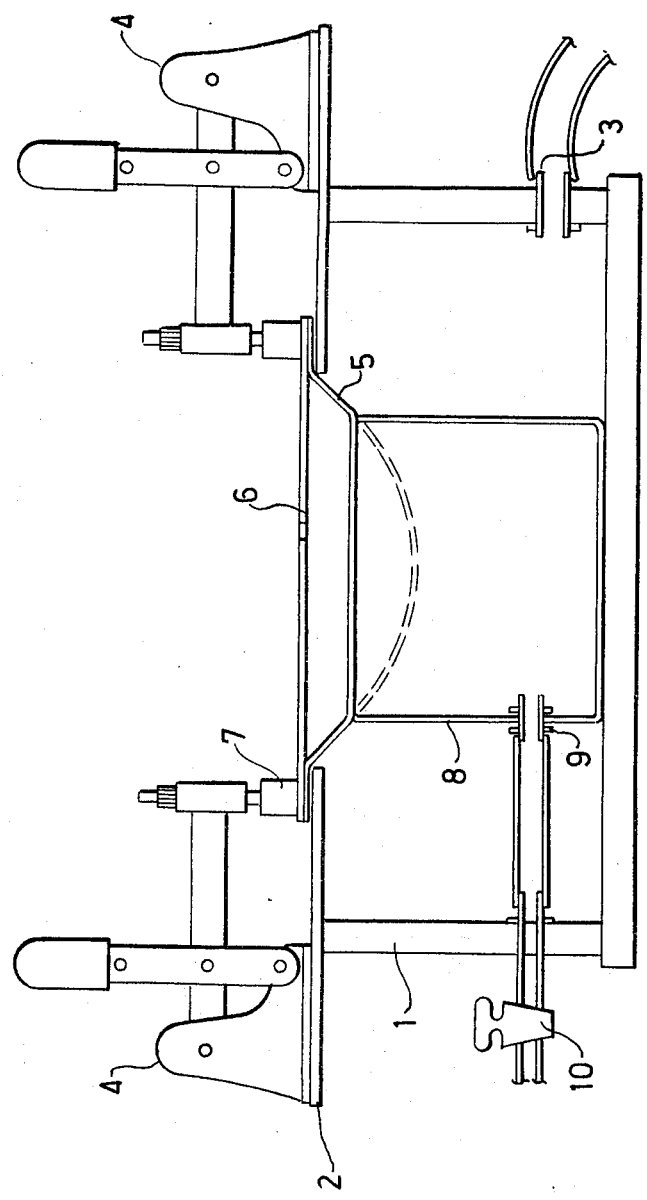
FIG. 1 is a vertical cross-section through a vacuum forming apparatus used to produce a double-walled unit of the invention.

In FIG. 1 a cylindrical vacuum forming chamber 9 is provided with a circular flanged lid 2 which is adapted to have a hexagonally shaped orifice extending over approximately half of the area of the flanged lid. Vacuum is applied via a vacuum pump (not shown in the drawing) to an outlet point 3 in the wall of the chamber. The flanged edge of the lid is provided with four toggle clamps 4 spaced equally around the perimeter of the lid. The toggle clamps provide a means of tightly clamping thermoplastic sheets 5 and 6 between a cylindrical annular clamping ring 7 and the lid 2. The vacuum forming chamber contains an open-ended cylindrical vessel 8 situated centrally with respect to the hexagonal orifice and providing a gap of approximately 3 cm between the rim of the vessel 8 and the lower surface of the sheet 5. The vessel 8 is provided with an inlet 9 which passes through the wall of the vacuum forming chamber and is terminated in a stop-cock 10.

The vacuum forming chamber 1 is constructed with transparent walls, conveniently from poly(methyl methacrylate), to allow visibility into the chamber during the forming operation.

Figure 2:
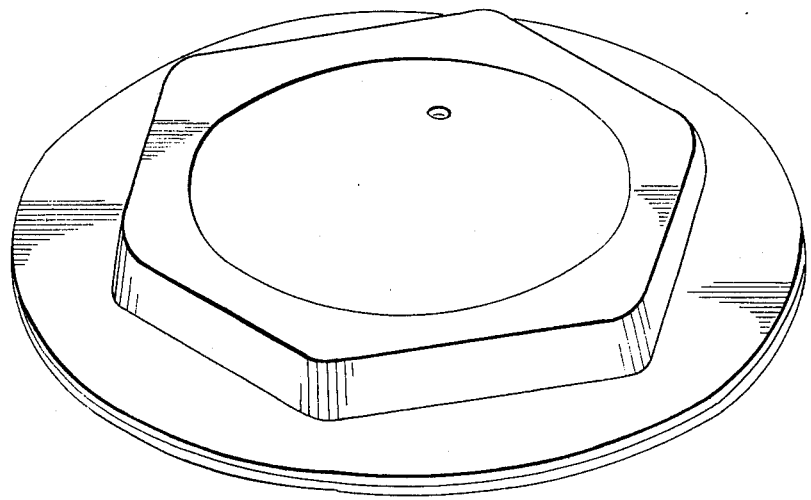
FIG. 2 is a perspective view of a double-walled unit produced by the process of this invention using the apparatus of FIG. 1.

In operation two heat-softened thermoplastic sheets in disc form, one of which is provided with a small orifice and at least one of which has been treated with an adhesive over an area corresponding to the area covered by the clamping rig 7, are clamped whilst in a softened condition between the clamping ring 7 and the lid 2. Vacuum is then applied to the chamber and the unapertured sheet 5 is drawn down through the orifice until the bulb so formed rests on the rim of the vessel 8 occluding the open end of this vessel. The vacuum in the space bounded by the vessel 8 and the sheet 5 is then rapidly released to equalise the pressure on either side of the sheet 5. The release of vacuum causes the area of sheet contained within the rim of the vessel 8 to flatten and provide a unit having approximately parallel sides. The unit thus produced is shown in perspective in FIG. 2.

The process of the invention is not limited to the details of the embodiment illustrated in FIG. 1. In particular the rim providing the support for the stretched sheet is not necessarily provided by a separate vessel but may be integrally formed with the lid of the vacuum forming chamber. Additionally, when articles of large dimensions are formed it may be advantageous to support the stretched sheet on a table so that the central area of the sheet is not unduly stretched before the outer extremities of the sheet make contact with the supporting rim. Such a table should be protected by methods known in the art, to prevent marring of the thermoplastic surface, such as by using soft mould cloth to cover the table. In practice, the time the softened sheet is in contact with a support of this type is very short, the procedure of equalising pressures on either side of the sheet being carried out to raise the softened sheet off the table as soon as the sheet makes contact with the supporting rim.

In a further embodiment of the process the clamping assembly may be provided with a knife edge which enables the edges of the unit to be trimmed to the required size during the thermoforming process. This provides an easy process for cutting the unit to shape and avoids the need to trim the edges of the unit after manufacture thereby reducing the risk of damage of the unit.

The process of this invention is equally applicable to a process in which the softened sheets are thermoformed using imposed pressure instead of vacuum. In this case pressure may be applied on the apertured side of the assembly to stretch the non-apertured sheet away from the apertured sheet to make contact with a supporting rim. The stretched sheet may then be flattened by rapidly equalising the pressures on either side of the stretched sheet either by increasing the pressure on the non-apertured side or by decreasing the pressure on the apertured side of the assembly.

Figure 3:
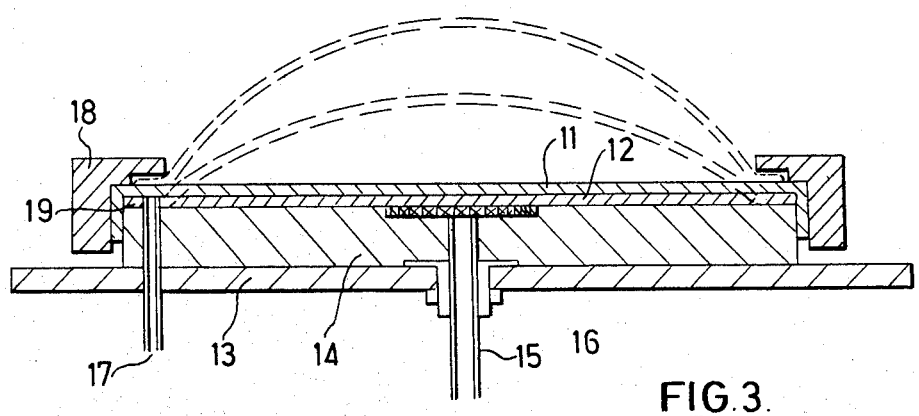
FIG. 3 is a vertical cross-section through an apparatus for forming a double-walled domelight.

FIG. 3 illustrates a further embodiment of the process in which a pair of thermoplastic sheets may be thermoformed to provide a double-walled dome.

In FIG. 3 a blow moulding apparatus comprises a rigid blowing table 13 and a blowing flange 14 suitable for forming a double-walled article from two preheated thermoplastic sheets 11 and 12. Compressed air is supplied via a pipe 15 passing through the blowing table and the blowing flange. The blowing flange is adapted to have a recess 16 to permit the air pressure to be applied over a wider area of the sheet to be formed. The blowing flange is covered with 2 layers of soft mould cloth (not shown) to prevent the surface quality of the softened sheet being impaired by contact with the blowing flange. The blowing table 13 and flange 14 are further adapted to receive a narrow pipe 17. A clamping ring 18 fitting around the blowing flange 14 may be clamped in position after insertion of the softened sheets 11 and 12 by means of toggle clamps (not shown).

The process of the invention in this embodiment is carried out by providing the thermoplastic sheet 12, having a thickness of about 8 mm and with other dimensions matching the perimeter of the blowing flange, with an aperture 19, of a size matching the external diameter of the narrow pipe 17, situated in such a position that when the perimeter of the sheet 12 is located with the perimeter of the blowing flange 14 the pipe 17 may be located within the aperture. A narrow strip of heat-activated adhesive is placed around the edge of the sheet 12. The second heat-softened sheet 11 having the same thickness but otherwise of dimensions extending beyond the perimeter of the sheet 12 is then placed over sheet 12 and the assembly is completed by positioning the clamping ring 18 and applying pressure by means of the toggle clamps (not shown). Adhesion is effected between the sheets by the action of heat and pressure on the adhesive strip. Compressed air is introduced through the narrow pipe 17 to separate the sheets slightly. Compressed air is then introduced via the pipes 15 and 17 to thermoform both sheets simultaneously to give a double-walled article in which the walls are separated by the required amount.

Figure 4:
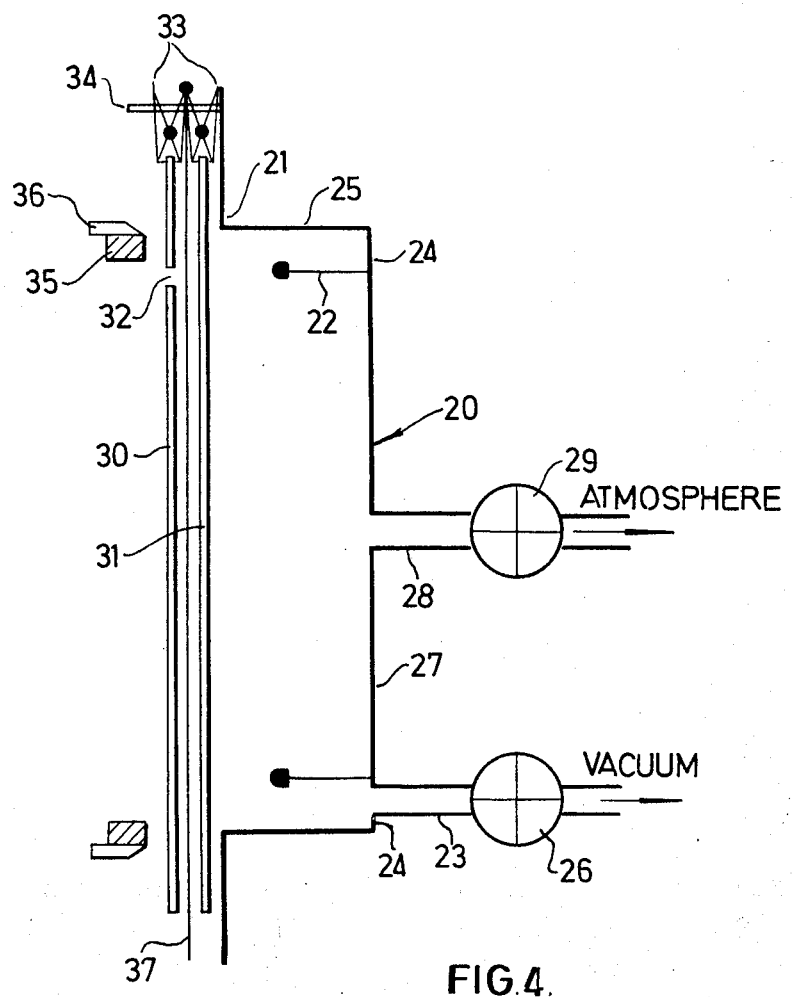
FIGS. 4, 5 and 6 illustrate the construction of a double-walled caravan window using the process of the invention.
Figure 5:
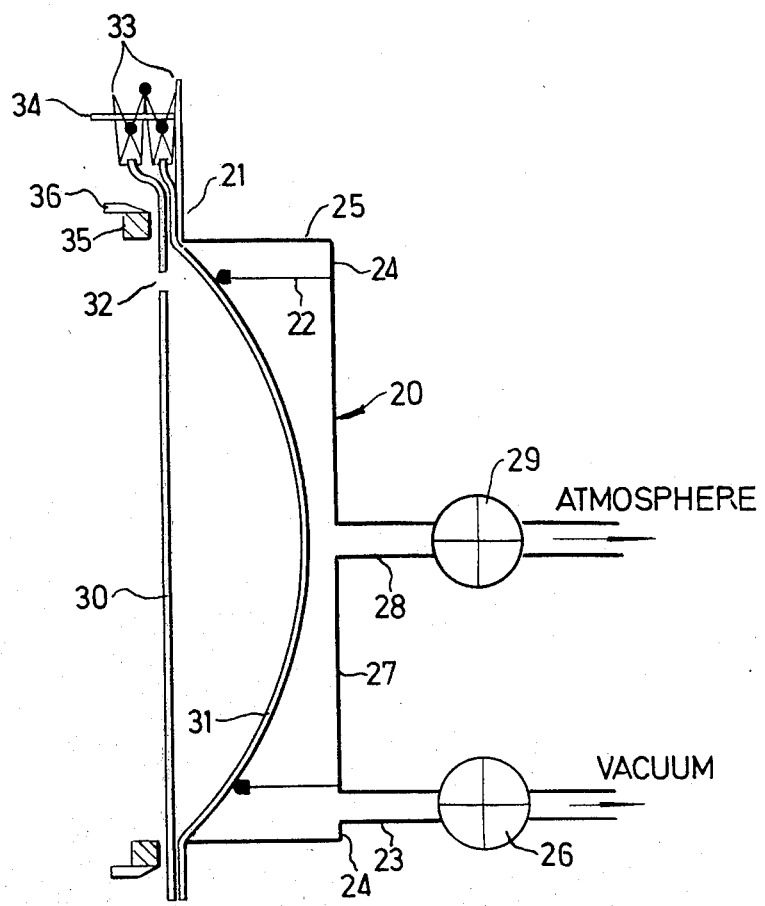
Figure 6:
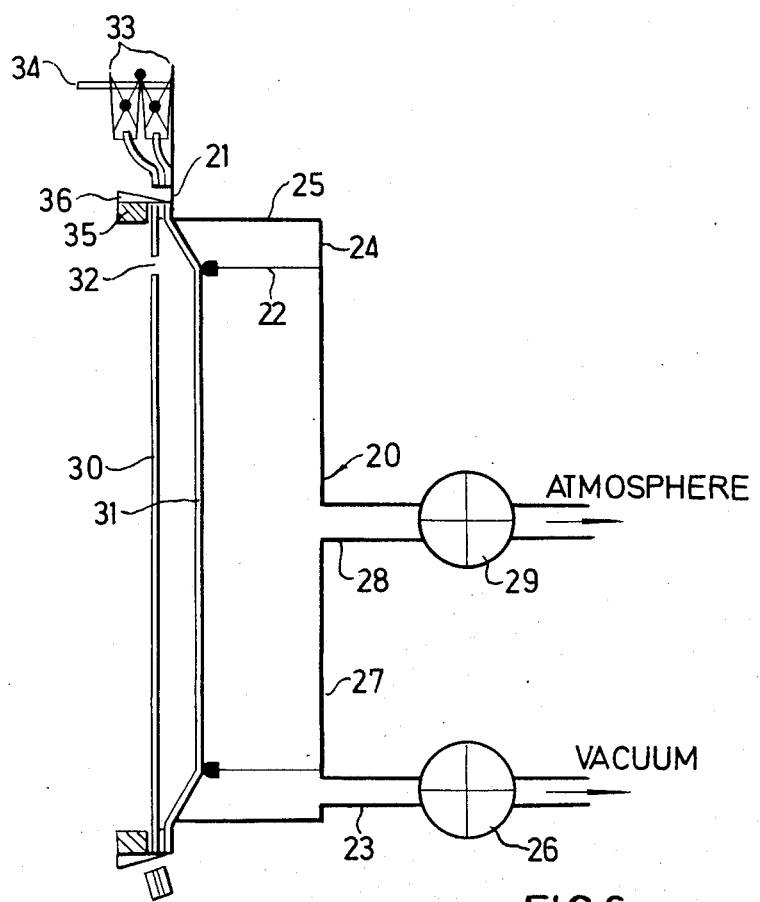

FIGS. 4, 5 and 6 illustrate the manufacture of a double-walled caravan window using a vertically disposed vacuum forming apparatus.

The vacuum forming apparatus shown schematically in FIG. 4 consists of an open box, generally denoted 20, provided with a flange 21 and an internally mounted sealing rim 22. An outlet pipe 23 is provided in the box 20 in a base portion 24 defined by an outer wall 25 of the box 20 and the upstanding sealing rim 22. The outlet pipe 23 is provided with a valve 26 through which a vacuum may be applied. A central base portion 27 of the box 20 is provided with an outlet pipe 28. A valve 29 provided in the outlet pipe permits the introduction of air into the vacuum forming apparatus.

Thermoplastic sheets 30 and 31, sheet 30 being provided with an aperture 32, are suspended by means of clips 33 from a rail 34 projecting horizontally from the vacuum forming apparatus.

The heated sheets are clamped against the flange 21 by means of a clamping ring 35 and a series of clamps (not shown). The outer perimeter of the clamping ring 35 is provided with a slidable knife member 36 which may be urged by actuating means (not shown) towards the flange 21.

In operation the thermoplastic sheets 30 and 31 are heated to a temperature above the softening point of the thermoplastic in an air oven (not shown) whilst suspended in a vertical position, contact between the sheets in the heated condition being prevented by means of the interposition of a sheet of brown paper 37. The heated sheets are then vertically suspended from the rail 34 and the interposed sheet 37 removed. The sheets are then clamped against the flange 21. After applying vacuum through valve 26 sheet 31 is drawn down until contact is made with the upstanding rim 22 as shown in FIG. 5. Valve 29 is then opened to atmosphere whilst maintaining the vacuum in that portion of the chamber defined by the outer wall 25, the upstanding sealing rim 22 and the portion of sheet 31 stretched between the wall 25 and the rim 22. The release of vacuum through valve 29 may be adjusted to ensure that sheet 31 moves to a position approximately parallel to the unstretched sheet 30 as shown in FIG. 6. Whilst the sheets are in a heat-softened condition the edges may be trimmed by actuating the knife member 36 as indicated in FIG. 6.

Figure 9:
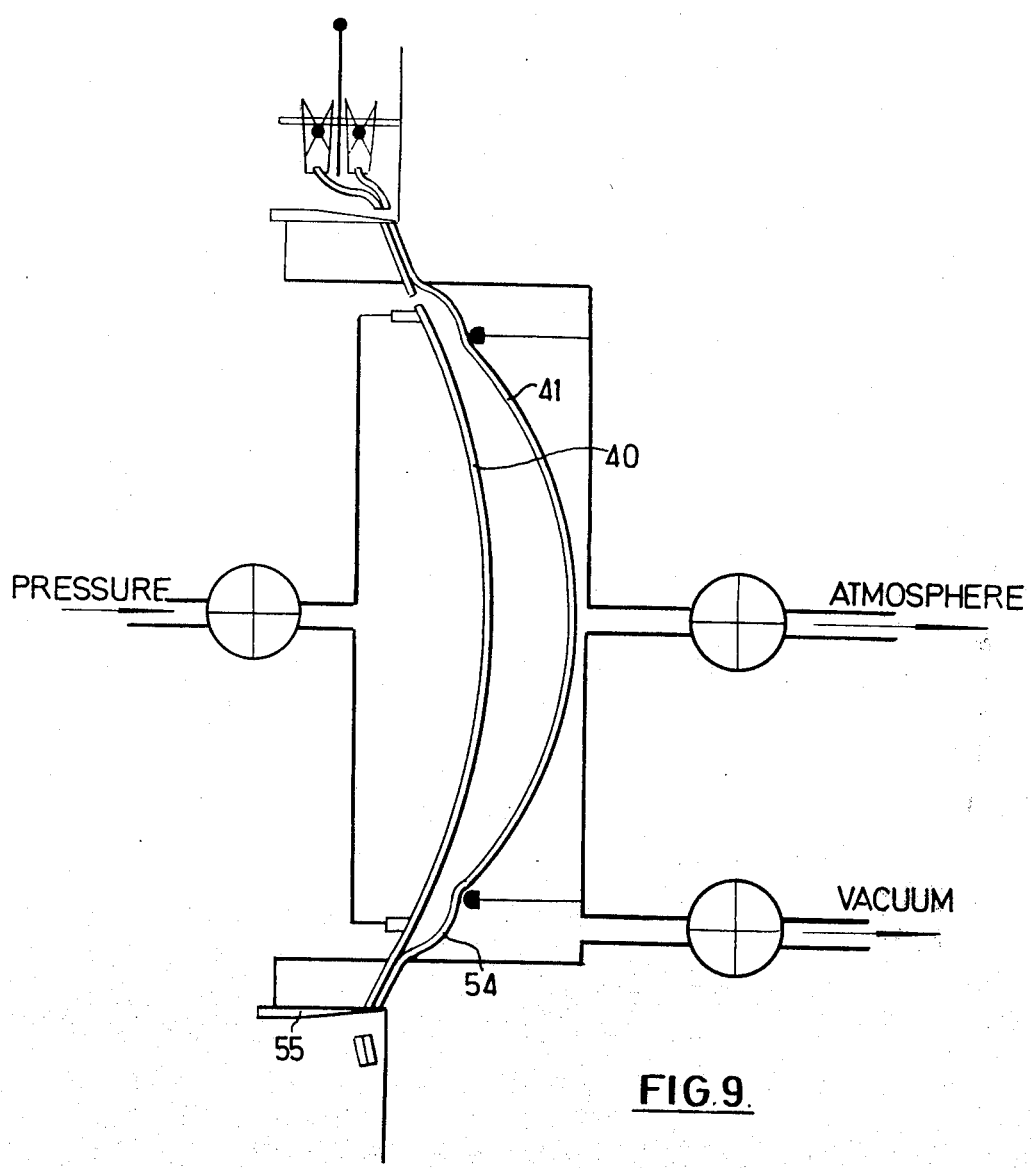

FIGS. 7, 8 and 9 illustrate in diagrammatic form a modification of the apparatus shown in FIGS. 4, 5 and 6 for the purpose of forming a double-skin domelights from a pair of thermoplastic sheets 40 and 41.

The apparatus used is similar to the apparatus of FIG. 4. The vacuum box generally denoted by 42 is modified to have a sloping shoulder surface 43 on the flange 44. A complementary sloping surface 45 is provided on a cooperable clamping frame 46. A cup-shaped member 47 is provided with a rubber flange 48 for sealing engagement with thermoplastic sheet 40. Member 47 is further provided with a pipe 50 and valve 51 for the introduction of air pressure.

After heating the thermoplastic sheets as previously described with reference to FIGS. 4, 5 and 6 the sheets, sheet 40 being apertured, are clamped against the sloping shoulder surface 43 by the complementary frame clamp 46. Vacuum is applied through the vacuum box via valve 52 to draw sheet 41 until contact is made with the upstanding rim 53 as shown in FIG. 8. At this point the portion of the sheet 41 within the rim is isolated from the vacuum source whilst the portion of the sheet 41 between the wall of the box and the upstanding rim 53 continues to be drawn down to form shoulders 54.

The sealing rim 48 of the cup-shaped member is then brought into sealing contact with sheet 40 over an area excluding the aperture. Air pressure is then applied through valve 51 until sheet 40 has been blown to the required shape shown in FIG. 9. During the blowing operation light pressure is applied to the cup member 47 to maintain sealing contact with sheet 40. This light pressure usually results in slight inward movement of that portion of the sheet lying outside the rim 53 and inside the clamping frame 46. In practice the vacuum drawing of sheet 41 and the subsequent blowing of sheet 40 can be carried out almost simultaneously.

Whilst the sheets are in a heat-softened condition the edges may be trimmed by actuating a knife-member 55.

The purpose of providing the domelight with the shoulder 54 is to ensure that the sheet 40 diverges as much as possible from sheet 41 in the vicinity of the sloping flange. When the divergence of the sheets is small it has been found that any condensation which collects when the domelight is in use drains to cover a significant area of the domelight around the flange, presenting an unattractive appearance and causing some reduction in the amount of light transmitted. Stretching of sheet 40 to form shoulder 54 ensures that any condensation which drains into the bottom of the domelight enclosure is as inconspicuous as possible.

In the embodiments of the process described with reference to the drawings the marring of the surface of the sheets is avoided because the process provided enables the sheets to be thermoformed without resorting to the use of moulds which would otherwise produce surface defects.

The process is of particular value in the shaping of poly(methyl methacrylate) sheet and especially for making glazing units from transparent sheet. For this material the preferred temperature range used to soften the sheet is 140°C to 170°C. The process is equally applicable to sheet formed of a copolymer containing a major proportion of methyl methacrylate.

The process can also be applied to the construction of double-walled articles from other thermoplastic materials, for example cellulose acetate-butyrate, polymers and copolymers of styrene, polymers and copolymers of vinyl chloride and suitable blends of any of the materials described including poly(methyl methacrylate). Additionally, blends of rubbers and resins, for example, butadiene/styrene copolymer rubbers and styrene/acrylonitrile copolymer resins may be used.

The thermoplastic sheets used in the process of the invention may contain additives, for example stabilisers, pigments or fillers, including metallic fillers introduced to give a decorative effect. Also useful are transparent thermoplastic sheets which have been partially coated with a material suitable for reflecting infra-red radiation such as a paint containing aluminium. Articles formed from such partially coated sheets are particularly useful for fabricating domelights for use in buildings where it is required to reduce the heat build-up in the building due to incident infra-red radiation.

The double-walled units made from transparent sheet are suitable for use in many glazing applications especially in caravans where the thermal and acoustical properties provided by the unit are particularly useful. In this application poly(methyl methacrylate) sheet is a particularly suitable material of construction because of its high degree of clarity, low density, good thermal insulation properties and toughness.

Other applications include lighting fittings, box signs, and in general any enclosure which may be formed from a pair of sheets by the process of this invention.

We claim:

1. A method of forming a double-walled unit comprising the steps of (1) selecting two sheets of an organic thermoplastic material, a first sheet having a perimeter fitting wholly within or matching the perimeter of the second sheet, (2) providing one of the sheets with at least one aperture to allow the passage of air into the space between the sheets so that each sheet can be shaped independently of the other after they have been bonded together about their perimeter, (3) providing means for bonding the two sheets together about their perimeters and heating at least the unapertured sheet to a temperature above the softening point of the thermoplastic, (4) stretching the unapertured sheet relative to the other bonded sheet by means of different pressures acting on each of the sheets to give a desired shape, the control of the shape being effected by the different pressures applied so that the use of moulds is avoided, and (5) allowing the unit to cool below the softening point of the thermoplastic material.

2. A method of forming a double-walled unit comprising the steps of (1) selecting two sheets of an organic thermoplastic material, a first sheet having a perimeter fitting wholly within or matching the perimeter of the second sheet, (2) providing one of the sheets with at least one aperture to allow the passage of air into the space between the sheets so that each of the sheets can be shaped independently of the other after they have been bonded together about their perimeter, (3) heating at least the unapertured sheet to a temperature above the softening point of the thermoplastic, (4) applying a clamping means to the perimeter of the sheets thereby bonding them together by the application of pressure over the area of the sheets contacted by the clamping means, (5) stretching the unapertured sheet relative to the other sheet by means of different pressures acting on each of the sheets to give a desired shape, the control of the shape being effected by the different pressures applied so that the use of moulds is avoided, and (6) allowing the unit to cool below the softening point of the thermoplastic material.

3. A method according to claim 1 in which the bonding means is in the form of a solution of a low molecular polymer of the polymer forming the sheet which forms a non-tacky film when applied to the sheet and dried and is reactivated to provide an adhesive when heated.

4. A method of forming a double walled article according to claim 1 comprising heating a pair of organic thermoplastic sheets above the softening point of the thermoplastic, clamping the pair of sheets between a pair of cooperable members with complementary sloping surfaces to bond them together and to provide a sloping flange on the bonded sheets, stretching a first sheet away from the second sheet by the application of different pressures acting on the two sheets, until the first sheet contacts a supporting rim spaced apart from the first sheet and enclosing a major proportion of the area of the stretched sheet, maintaining a pressure on the band of the first sheet lying outside the supporting rim to form a shoulder around the sheet between the rim and the clamped portion of the sheet, applying a pressure to the second sheet over an area of said second sheet not containing an aperture to stretch it towards the first sheet until the two sheets have a desired spatial relationship, before the unit is allowed to cool below the softening point of the thermoplastic sheet.

5. A method of forming a double-walled unit according to claim 4 in which pressure is applied to the second sheet by means of a cup member making sealing engagement with the sheet over an area of said second sheet not containing an aperture.

6. A method of forming a double-walled unit comprising the steps of (1) selecting two sheets of an organic thermoplastic material, a first sheet having a perimeter fitting wholly within or matching the perimeter of the second sheet, (2) providing one of the sheets with at least one aperture to allow the passage of air into the space between the sheets so that each sheet can be shaped independently of the other after they have been bonded together about their perimeter, (3) providing means for bonding the two sheets together about their perimeters and heating at least the unapertured sheet to a temperature above the softening point of the thermoplastic, (4) stretching away the unapertured sheet from the other sheet by means of the application of different pressures to the two sheets until the stretched sheet makes contact with a supporting rim spaced apart from the organic thermoplastic sheet and enclosing a major proportion of the area of the stretched sheet, (5) rapidly equalizing the atmospheric pressure on either side of the stretched sheet contained within the rim to bring the spaced apart sheets into substantially parallel relationship while maintaining contact between the rim and the stretched sheet, and (6) allowing the unit to cool below the softening point of the thermoplastic material.

7. A method of forming a double-walled unit comprising the steps of (1) selecting two sheets of an organic thermoplastic material, a first sheet having a perimeter fitting wholly within or matching the perimeter of the second sheet, (2) providing one of the sheets with at least one aperture to allow the passage of air into the space between the sheets so that each of the sheets can be shaped independently of the other after they have been bonded together about their perimeter, (3) heating at least the unapertured sheet to a temperature above the softening point of the thermoplastic, (4) applying a clamping means to the perimeter of the sheets thereby bonding them together by the application of pressure over the area of the sheets contacted by the clamping means, (5) stretching the unapertured sheet away from the other sheet by means of the application of different pressures to the two sheets until the stretched sheet makes contact with a supporting rim spaced apart from the organic thermplastic sheet and enclosing a major proportion of the area of the strecthed sheet, (6) rapidly equalizing the atmospheric pressure on either side of the stretched sheet contained within the rim to bring the spaced apart sheets into substantially parallel relationship while maintaining contact between the rim and the stretched sheet, and (7) allowing the unit to cool below the softening point of the thermoplastic material.

8. An apparatus for forming a double-walled unit from a pair of thermoplastic sheets comprising: means for clamping the pair of sheets together at their peripheries, means for heating at least one of the sheets to above the softening point of the thermoplastic, means for applying different fluid pressures to each of the sheets to stretch a heat-softened sheet relative to the other sheet, to give a desired separation of sheets, and upstanding rim for receiving a first stretched sheet, and means for independently varying the pressures acting on the areas of the stretched sheet inside and outside the contacted rim.

9. An apparatus according to claim 8 which includes a cup member for supplying pressure to the second of the pair of sheets whereby the second sheet can be stretched into the space formed after stretching the first sheet towards the rim by contacting the cup member with an area of the second of the pair of sheets not containing an aperture and applying pressure.

* * * * *